(12) United States Patent
Kim et al.

(10) Patent No.: US 11,488,613 B2
(45) Date of Patent: Nov. 1, 2022

(54) RESIDUAL CODING METHOD OF LINEAR PREDICTION CODING COEFFICIENT BASED ON COLLABORATIVE QUANTIZATION, AND COMPUTING DEVICE FOR PERFORMING THE METHOD

(71) Applicants: Electronics and Telecommunications Research Institute, Daejeon (KR); The Trustees of Indiana University, Indianapolis, IN (US)

(72) Inventors: Minje Kim, Bloomington, IN (US); Kai Zhen, Bloomington, IN (US); Mi Suk Lee, Daejeon (KR); Seung Kwon Beack, Daejeon (KR); Jongmo Sung, Daejeon (KR); Tae Jin Lee, Daejeon (KR); Jin Soo Choi, Daejeon (KR)

(73) Assignees: Electronics and Telecommunications Research Institute, Daejeon (KR); The Trustees of Indiana University, Indianapolis, IN (US)

(*) Notice: Subject to any disclaimer, the term of this patent is extended or adjusted under 35 U.S.C. 154(b) by 81 days.

(21) Appl. No.: 17/098,090

(22) Filed: Nov. 13, 2020

(65) Prior Publication Data

US 2021/0142812 A1 May 13, 2021

Related U.S. Application Data

(60) Provisional application No. 62/934,868, filed on Nov. 13, 2019.

(30) Foreign Application Priority Data

Nov. 13, 2020 (KR) .................. KR10-2020-0152071

(51) Int. Cl.
*G10L 19/08* (2013.01)
*G10L 19/032* (2013.01)
(Continued)

(52) U.S. Cl.
CPC ................ *G10L 19/08* (2013.01); *G06N 3/08* (2013.01); *G10L 13/02* (2013.01); *G10L 19/032* (2013.01);
(Continued)

(58) Field of Classification Search
None
See application file for complete search history.

(56) References Cited

U.S. PATENT DOCUMENTS 5,854,998 A * 12/1998 Flomen ................. G10L 19/113
704/223
7,596,492 B2 9/2009 Sung et al.
(Continued)

OTHER PUBLICATIONS

Valin, Jean-Marc, and Jan Skoglund. "LPCNet: Improving neural speech synthesis through linear prediction." ICASSP 2019-2019 IEEE International Conference on Acoustics, Speech and Signal Processing (ICASSP). IEEE, 2019. (Year: 2019).*
(Continued)

*Primary Examiner* — Douglas Godbold
(74) *Attorney, Agent, or Firm* — William Park & Associates Ltd.

(57) ABSTRACT

Disclosed are a method for coding a residual signal of LPC coefficients based on collaborative quantization and a computing device for performing the method. The residual signal coding method includes: generating encoded LPC coefficients and LPC residual signals by performing LPC analysis and quantization on an input speech; Determining a predicted LPC residual signal by applying the LPC residual signal to cross module residual learning; Performing LPC synthesis using the coded LPC coefficients and the predicted LPC residual signal; It may include the step of determining an output speech that is a synthesized output according to a result of performing the LPC synthesis.

14 Claims, 7 Drawing Sheets

(51) Int. Cl.
*G10L 19/26* (2013.01)
*G06N 3/08* (2006.01)
*G10L 25/30* (2013.01)
*G10L 13/02* (2013.01)
*G10L 21/0208* (2013.01)

(52) U.S. Cl.
CPC ........ *G10L 19/265* (2013.01); *G10L 21/0208* (2013.01); *G10L 25/30* (2013.01)

(56) References Cited

U.S. PATENT DOCUMENTS

| | | | |
|---|---|---|---|
| 7,599,833 B2 | 10/2009 | Sung et al. | |
| 2012/0271644 A1* | 10/2012 | Bessette | G10L 19/03 704/E19.035 |
| 2012/0284020 A1* | 11/2012 | Chathoth | G10L 19/04 704/219 |
| 2013/0124215 A1* | 5/2013 | Lecomte | G10L 19/20 704/500 |
| 2014/0058737 A1* | 2/2014 | Ishikawa | G10L 19/20 704/500 |
| 2021/0074308 A1* | 3/2021 | Skordilis | G10L 25/30 |
| 2021/0142812 A1* | 5/2021 | Kim | G10L 19/032 |

OTHER PUBLICATIONS

Kankanahalli, Srihari. "End-to-end optimized speech coding with deep neural networks." 2018 IEEE International Conference on Acoustics, Speech and Signal Processing (ICASSP). IEEE, 2018. (Year: 2018).*

Kai Zhen et al., Cascaded Cross-Module Residual Learning towards Lightweight End-to-End Speech Coding, arXiv preprint arXiv:1906.07769 (Sep. 13, 2019).

Kaiming He et al., Deep Residual Learning for Image Recognition, Jun. 27-30, 2016, pp. 770-778, 2016 IEEE Conference on Computer Vision and Pattern Recognition (CVPR), CVPR2016, Las Vegas, NV, USA.

* cited by examiner

(a) Cross-frame windowing (b) Sub-frame windowing (c) Synthesis windowing

RESIDUAL CODING METHOD OF LINEAR PREDICTION CODING COEFFICIENT BASED ON COLLABORATIVE QUANTIZATION, AND COMPUTING DEVICE FOR PERFORMING THE METHOD

CROSS-REFERENCE TO RELATED APPLICATION(S)

This application claims the benefit of U.S. Patent Application No. 62/934,868, filed on Nov. 13, 2019 and No. 10-2020-0152071, filed on Nov. 13, 2020, in the Korean Intellectual Property Office, the disclosure of which is incorporated herein by reference.

BACKGROUND

1. Field of the Invention

One or more example embodiments relate to a residual coding method of LPC coefficients based on collaborative quantization and a computing device for performing the method.

2. Description of the Related Art

Speech coding refers to a method of quantizing a speech signal into a low bit stream for efficient transmission and storage in a communication system. The design of the speech codec solves the disadvantages of low bit rate, high perceptual quality, low complexity and delay.

Most speech codecs may be classified into a vocoder and a waveform coder. Vocoder doesn't use parameters to model the human speech production process such as vocals, pitch frequency, etc. However, the waveform coder may compress and reconstruct the waveform to make the decoded speech "perceptually" similar to the input speech.

Conventional vocoders have excellent computational efficiency and may encode speech at a very low bit rate, whereas waveform coders support a much wider bit rate range with scalable performance and are effective against noise.

LPC (Linear Predictive Coding), an all pole linear filter in both the conventional vocoder and waveform coder, may efficiently model the power spectrum with only a few coefficients. In the case of a vocoder, the LPC residual is modeled as a synthetic excitation signal using a pitch pulse train or white noise component. On the other hand, in the case of a waveform coder, the residual signal may be directly compressed to a desired bit rate before being synthesized into a decoded signal.

LPC is also useful in modern neural speech codecs. Autoregressive models may greatly improve the quality of synthesized speech, but model complexity arises during the decoding process.

SUMMARY

The present invention relates to a method of coding a speech signal using LPC coefficients and a stepwise autoencoder, and in particular, provides a method and apparatus for a structure and a training method for simultaneously optimizing quantization of LPC coefficients and quantization of LPC residual signals.

The present invention proposes a structure and a training method capable of optimizing the LPC coefficient and an autoencoder stepwise connected together.

According to an aspect, there is provided a residual signal coding method of LPC (Linear Prediction Coding) coefficients performed by a computing device, the residual signal coding method comprising generating coded LPC coefficients and LPC residual signals by performing, by a computing device, LPC analysis and quantization on an input speech; determining a predicted LPC residual signal by applying the LPC residual signal to cross module residual learning; performing LPC synthesis using the coded LPC coefficients and the predicted LPC residual signal; determining an output speech that is a synthesized output according to the result of performing the LPC synthesis.

The cross module residual learning including: applying a high-pass filter to the input speech; applying a pre-emphasis filter to a result applied by the high pass filter; determining the LPC coefficient from the result of applying the pre-emphasis filter; generating a soft assignment matrix of the coded LPC coefficients and softmax by quantizing the LPC coefficients; and determining an LPC residual signal based on a result of applying the pre-emphasis filter and a result of quantizing the LPC coefficients.

The determining the LPC coefficient, comprising: performing cross-frame windowing by applying a window to all frames of the input speech to which the pre-emphasis filter has been applied; performing sub-frame windowing by applying a window to a plurality of sub-frames corresponding to an intermediate region among all frames of the input speech from the cross-frame windowing result; performing synthesis windowing by overlapping the sub-frame windowing result.

The LPC coefficient may be quantized by applying a trainable softmax to the LPC coefficient of a LSP (line spectrum pair) domain.

The LPC residual signal is encoded by autoencoders of 1D-CNN (convolution neural network).

The autoencoders of the 1D-CNN is trained sequentially by using a residual signal that is the output of a previous autoencoder, as the input of a following autoencoder.

A differential coding is applied to the output of the autoencoder with respect to the autoencoders of the 1D-CNN, The output of the autoencoder is applied with differential coding based on a length of the code for each frame of the autoencoder.

According to an aspect, there is provided a computing device for performing a residual signal coding method of LPC coefficients, the computing device comprising: one or more processor configured to generate encoded LPC coefficients and LPC residual signals by performing, by a computing device, LPC (Linear Prediction Coding) analysis and quantization on the input speech; determine a predicted LPC residual signal by applying the LPC residual signal to cross module residual learning; perform LPC synthesis using the coded LPC coefficients and the predicted LPC residual signal; determine an output speech that is a synthesized output according to the result of performing the LPC synthesis.

The processor performs applying a high-pass filter to the input speech; applying a pre-emphasis filter to a result applied by the high pass filter determining the LPC coefficient from the result of applying the pre-emphasis filter; generating a soft assignment matrix of the coded LPC coefficients and softmax by quantizing the LPC coefficients; and determining an LPC residual signal based on a result of applying the pre-emphasis filter and a result of quantizing the LPC coefficients.

The processor for determining the LPC coefficient performs performing cross-frame windowing by applying a window to all frames of the input speech to which the pre-emphasis filter has been applied; performing sub-frame windowing by applying a window to a plurality of sub-frames corresponding to an intermediate region among all frames of the input speech from the cross-frame windowing result; performing synthesis windowing by overlapping the sub-frame windowing result.

The LPC coefficient may be quantized by applying a trainable softmax to the LPC coefficient of a LSP domain.

The LPC residual signal is encoded by 1D-CNN autoencoders.

The autoencoders of the 1D-CNN is trained sequentially by using a residual signal that is the output of a previous autoencoder, as the input of a following autoencoder.

A differential coding is applied to the output of the autoencoder with respect to the autoencoders of the 1D-CNN, The output of the autoencoder is applied with differential coding based on a length of the code for each frame of the autoencoder.

Additional aspects of example embodiments will be set forth in part in the description which follows and, in part, will be apparent from the description, or may be learned by practice of the disclosure.

BRIEF DESCRIPTION OF THE DRAWINGS

These and/or other aspects, features, and advantages of the invention will become apparent and more readily appreciated from the following description of example embodiments, taken in conjunction with the accompanying drawings of which.

DETAILED DESCRIPTION

Hereinafter, example embodiments will be described in detail with reference to the accompanying drawings. The scope of the right, however, should not be construed as limited to the example embodiments set forth herein. Like reference numerals in the drawings refer to like elements throughout the present disclosure.

Various modifications may be made to the example embodiments. Here, the examples are not construed as limited to the disclosure and should be understood to include all changes, equivalents, and replacements within the idea and the technical scope of the disclosure.

Although terms of "first," "second," and the like are used to explain various components, the components are not limited to such terms. These terms are used only to distinguish one component from another component. For example, a first component may be referred to as a second component, or similarly, the second component may be referred to as the first component within the scope of the present disclosure.

The terminology used herein is for the purpose of describing particular embodiments only and is not intended to be limiting. As used herein, the singular forms are intended to include the plural forms as well, unless the context clearly indicates otherwise. It will be further understood that the terms "comprise" and/or "comprising," when used in this specification, specify the presence of stated features, integers, steps, operations, elements, components or a combination thereof, but do not preclude the presence or addition of one or more other features, integers, steps, operations, elements, components, and/or groups thereof.

Unless otherwise defined herein, all terms used herein including technical or scientific terms have the same meanings as those generally understood by one of ordinary skill in the art. Terms defined in dictionaries generally used should be construed to have meanings matching contextual meanings in the related art and are not to be construed as an ideal or excessively formal meaning unless otherwise defined herein.

Regarding the reference numerals allocated to the elements in the drawings, it should be noted that the same elements will be designated by the same reference numerals, wherever possible, even though they are shown in different drawings. Also, in the description of example embodiments, detailed description of well-known related structures or functions will be omitted when it is deemed that such description will cause ambiguous interpretation of the present disclosure.

Hereinafter, the example embodiments will be described in detail with reference to the accompanying drawings.

Figure 1:
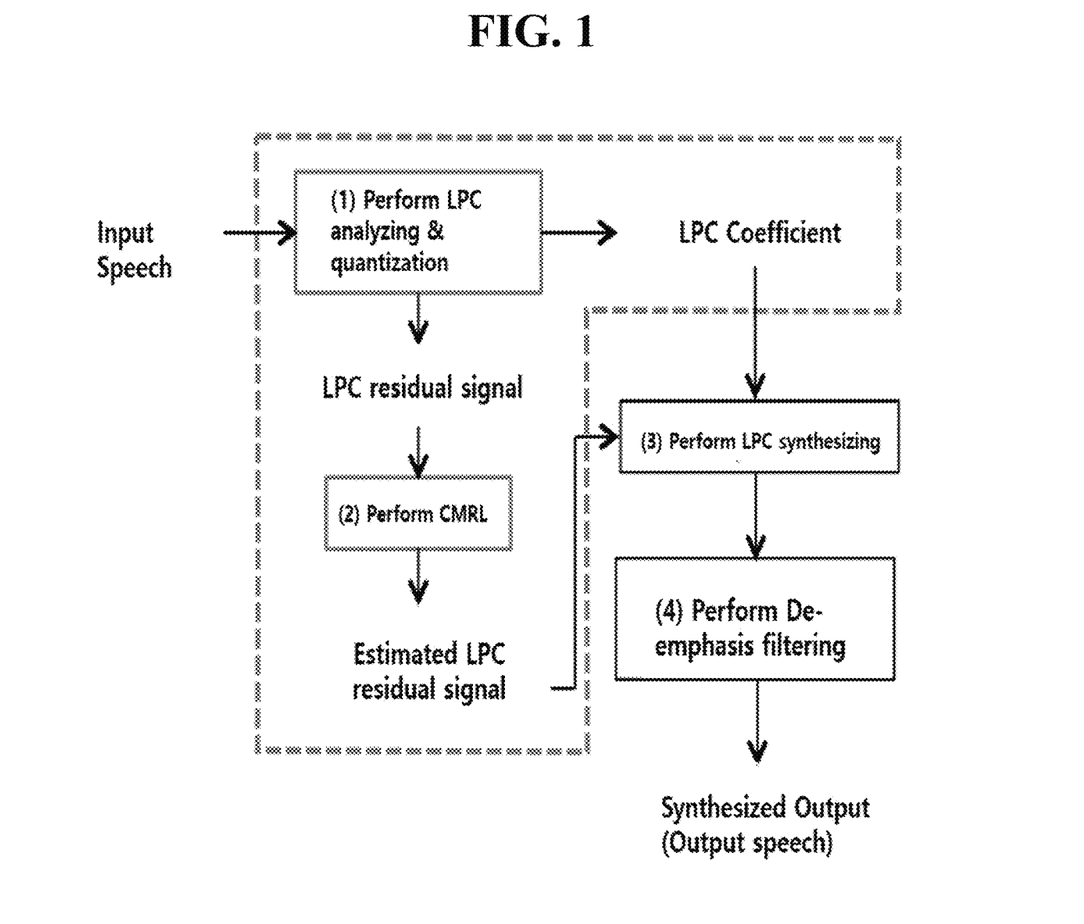
FIG. 1 illustrates a method of coding a residual signal of LPC coefficients based on collaborative quantization according to an embodiment of the present invention.

FIG. 1 illustrates a method of coding a residual signal of LPC coefficients based on collaborative quantization according to an embodiment of the present invention.

According to an embodiment of the present invention collaborative quantization for trainable LPC quantization is proposed so that a neural network and an LPC may be better integrated for scalable waveform coding with low model complexity. By defecting different autoencoding modules for coding the LPC residual signal, collaborative quantization may learn optimal bit assignment between LPC coefficients and code layers of other neural networks. By the learning method of collaborative quantization proposed in the present invention, the collaborative quantization may be extended to match the performance of the latest codec of 24 kbps while having improved performance compared to the previous method and having low complexity.

The LPC is useful for modern neural speech codecs, and may unload computational overhead from neural networks. In addition, Cross Module Residual Learning (CMRL), as a neural waveform coder, uses LPC as a preprocessor, and may model LPC residual signals to match the latest speech quality.

Neural speech codec requires scalability and efficiency, which supports a wide range of bit rates for application in various devices. According to an embodiment of the present invention, collaborative quantization is applied to jointly learn the codebook of LPC coefficients and residual signals.

According to an embodiment of the present invention, collaborative quantization proposes a digital signal processing method specialized in a domain. According to collaborative quantization, it may be seen that the model complexity is much lower while achieving a much higher quality at 9 kbps than the conventional quantization method. In addition, it shows that collaborative quantization may be extended to 24 kbps, which is superior to AMR-WB and Opus Collaborative quantization is a neural waveform codec and has much smaller parameters than conventional models.

Referring to FIG. 1, a residual signal coding method of LPC coefficients may be performed by a computing device. The computing device may perform the residual signal coding method through the following process.

In step (1), the computing device may perform LPC analysis and quantization using an input speech. Then, the computing device may output the LPC residual signal and LPC coefficients through step (1).

In step (2), the computing device may learn the LPC residual signal. For example, the computing device may learn the LPC residual signal based on the cross module residual learning (CMRL). LPC residual signals predicted as a result of learning the LPC residual signal may be output. The operation of cross-module residual learning will be described in detail with reference to FIGS. 5 and 6 below.

In step (3), the computing device may perform LPC dequantization and LPC synthesis using the LPC coefficients and the LPC residual signal.

In step (4), the computing device may determine an output speech that is a synthesized output by applying de-emphasis filtering to the output result of LPC synthesis.

Figure 2:
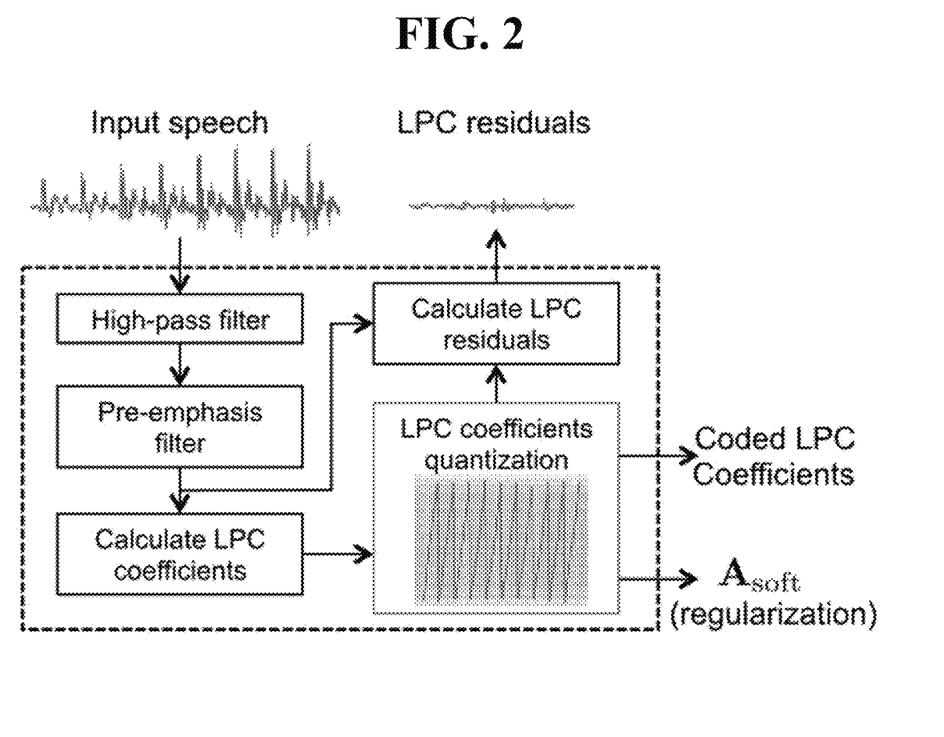
FIG. 2 illustrates a diagram illustrating a method of analyzing trainable LPC coefficients according to an embodiment of the present invention.

FIG. 2 illustrates a diagram illustrating a method of analyzing trainable LPC coefficients according to an embodiment of the present invention.

FIG. 2 illustrates a specific process for LPC analysis and quantization described in step (1) of FIG. 1. According to an embodiment of the present invention, quantization of LPC coefficients may be applied to a training algorithm of a neural network by integrating LPC analysis into a pipeline of cross-module residual learning. The overall process of LPC is based on AMR-WB.

FIG. 2 is performed by the computing device described in FIG. 1. In step (1) of FIG. 2, the computing device may apply a high-pass filter to the input speech. Then, in step (2), the computing device may additionally apply a pre-emphasis filter to the result of applying the high pass to the input speech.

As an example, the high pass filter may be a filter having a cut-off frequency of 50 Hz. In addition, the pre-emphasis filter may be set to $H_{emp}(Z)=1-0.68z^{-1}$ and is used to remove artifacts at high frequencies.

In step 3 of FIG. 2, the computing device may determine the LPC coefficient. In step (2), the input speech to which the pre-emphasis filter is applied may be divided into a plurality of frames. For example, the input speech may be divided into frames with 1024 sample points.

Before the LPC coefficient is determined, each of the plurality of frames divided from the input speech may be window processed. The process of processing the window will be described in detail in FIG. 4.

In step 4 of FIG. 2, the computing device may quantize the LPC coefficients. As an example, the computing device may apply trainable softmax quantization to the LPC coefficients in the LSP domain so that each LPC coefficient may represent its nearest centroid. Softmax quantization will be described in detail in FIG. 3.

For each frame x in which the window is processed, the LPC coefficient expressed in the LSP domain is expressed as $h_{LPC}=\mathcal{F}_{LPC}(x)$. The LPC-specific centroid $b_{LPC}$ needs to be learned and may be used to construct a soft assignment matrix.

For example, in the present invention, the order of LPC coefficients may be set to 16, and the number of centers may be set to 256 (eg, 8 bits). The size of the soft assignment matrix and the hard assignment matrix is 16*256. Further, the row of the soft assignment matrix is a probability vector, and the row of the hard assignment matrix is a one-hot vector.

Meanwhile, in step (4) of FIG. 2, the computing device may determine the coded LPC coefficients and the soft assignment matrix $A_{soft}$.

In step (5) of FIG. 2, the computing device may determine the LPC residual signal by using the quantized LPC coefficients and the input speech to which the pre-emphasis filter is applied in step (2).

<Residual Coding>

The LPC residual signal calculated in step (1) of FIG. 1 may be compressed by autoencoders of 1D-CNN. Here, the autoencoders of 1D-CNN are the autoencoders described in FIGS. 5 and 6.

Figure 7:
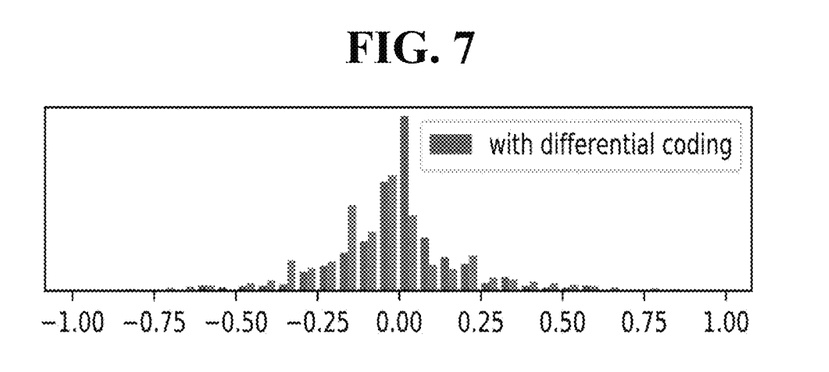
FIG. 7 is diagram for explaining a centralized distribution of differential coding through coding of a residual signal according to an embodiment of the present invention.

Differential coding may be applied to the output $h=[h_0, h_1, \ldots, h_{m-1}]$ of autoencoders. Here, m denotes the length of the code for each frame of each autoencoder. The input scalar for softmax quantization is $\Delta h_i = h_i - h_{i-1}$ Softmax quantization starts from distribution of codes represented by more centralized real values as shown in FIG. 7. As shown in FIG. 1, quantization of LPC coefficients and residual coding of cross-module residual learning are optimized together. LPC analysis not only minimizes the energy of the residual signal as much as possible, but also finds a pivot that easily performs residual compression from the following modules of cross-module residual learning.

Figure 3:
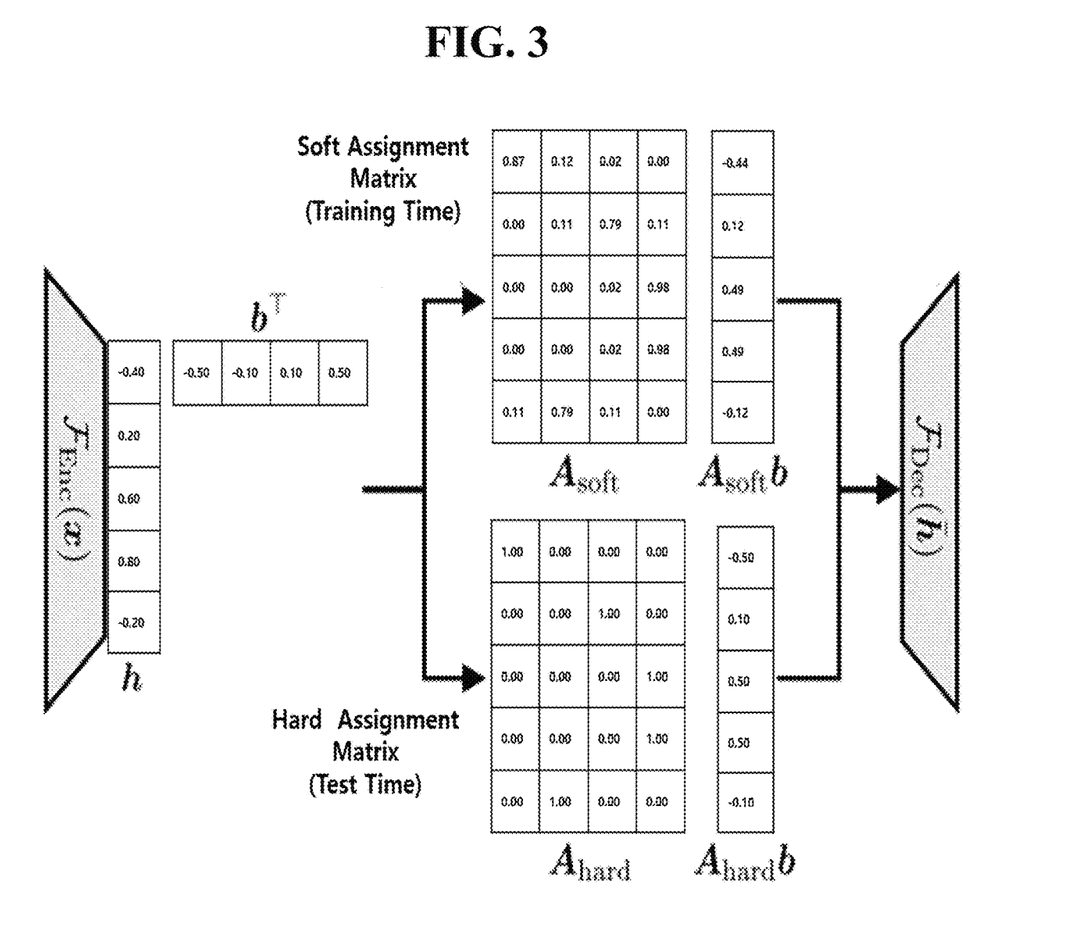
FIG. 3 illustrates a diagram illustrating a softmax quantization process according to an embodiment of the present invention.

FIG. 3 illustrates a diagram illustrating a softmax quantization process according to an embodiment of the present invention.

To compress the speech signal, a core component of the autoencoder is a trainable quantizer. The trainable quantizer learns the discrete representation of the code layer included in autoencoder. A quantization method suitable for neural networks such as soft-hard quantization is called softmax quantization in end-to-end speech coding.

For an input frame $x \in \mathbb{R}^S$ of S samples, the output of the encoder in the autoencoder is determined as $h=\mathcal{F}_{Enc}(x)$. Each of the outputs of encoder represents a 16-bit floating point value. Given J=32 centroids represented by a vector $b \in \mathbb{R}^J$, softmax quantization may map each sample to one of the J centroids for h. And each quantized sample may be represented by $\log_2 J$ bits. For example, when J is 32, it may be 5 bits.

Quantization process for softmax uses a hard assignment matrix $A_{hard} \in \mathbb{R}^{I \times J}$. Here, I means the dimension of the code of the centers, and J means the dimension of the vector of the centers. The hard assignment matrix is determined by Equation 1 based on the Euclidean distance matrix $D \in \mathbb{R}^{I \times J}$.

$$A_{hard}(i,j) = \begin{cases} 1 & \text{if } D(i,j) = \min_{j'} D(i,j') \\ 0 & \text{otherwise} \end{cases} \quad \text{[Equation 1]}$$

Quantization for softmax may assign the nearest centroid for each of the elements $\bar{h} = A_{hard} b_{of} h$. This process is not differentiable and blocks the backpropagation error flow during training.

Instead, soft assignment is used during training as follows:

(i) The computing device may calculate the Euclidean distance matrix $D \in \mathbb{R}^{I \times J}$ between the elements of h and b.

(ii) The computing device may calculate the soft assignment matrix from the dissimilarity matrix using the softmax function $A_{soft}$=softmax($-\alpha D$). Here, the softmax function $A_{soft}(i,j)$ may be changed to a probability vector by applying to each row of the soft assignment matrix. The probability vector holds the highest probability value most similar to $b_j$. During training, $A_{soft}b$ is approximated as the hard assignments, and the approximated results are provided to the decoder as input codes.

An additional variable $\alpha$ controls the softness of the softmax function, as in $\lim_{\alpha \to \infty} A_{soft} = A_{hard}$. $\alpha$ may be set to 300 so that a gap between the soft assignment matrix $A_{soft}$ and the hard assignment matrix $A_{hard}$ is minimized.

(iii) At the test time, $A_{hard}$ replace the $A_{soft}$ by changing the largest probability value in the row to zero. $A_{hard}b$ produces a quantized code $\bar{h}$.

Figure 4:
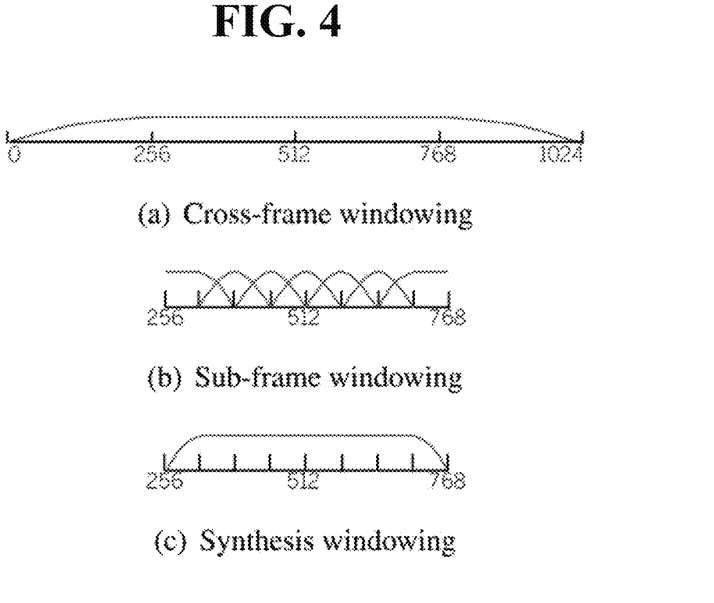
FIG. 4 illustrates diagram illustrating a process of LPC windowing according to an embodiment of the present invention.

FIG. 4 illustrates diagram illustrating a process of LPC windowing according to an embodiment of the present invention.

In FIG. 2, the input speech to which the pre-emphasis filtering is applied may be divided into a plurality of frames. For example, the input speech may be divided into frames of 1024 sample points. Before the LPC coefficients are calculated in the input speech, a window is processed in each frame of the input speech to perform LPC windowing.

As may be seen in FIG. 4, the symmetric window may have a weight emphasized in the middle 50% region. In addition, the symmetric window is the left half of the Hann window having 512 sample points in the first 25% area, and the right half of the Hann window having 512 sample points in the remaining 25% area.

In addition, LPC is performed on the frame in which the window is processed in the time domain s. The result of performing the prediction of the t-th sample is determined by Equation 2 below.

$$\hat{s}(t) = \Sigma_i \alpha_i s(t-i) \quad \text{[Equation 2]}$$

$\hat{s}(t)$ denotes the prediction of the t-th sample, $\alpha_i$ and denotes the i-th LPC coefficient. Frames are overlapped by 50%. The LPC order may be set to 16th order. As an example, the LPC coefficient is determined based on the Levinson Durbin algorithm, and this algorithm may be expressed as a line spectral pair (LSP) that is robust to quantization.

According to an embodiment of the present invention, windowing of a subframe is applied to calculate the LPC residual signal. For example, (a) of FIG. 4 shows windowing for a cross frame, (b) shows windowing for a sub-frame, and (c) shows a synthesis windowing. The computing device separately calculates the residual signal of each subframe for the divided speech frames and the quantized LPC coefficients from the input speech.

At this time, in the frame of 1024 sample points (FIG. 4 (a)), the middle 50% (for example, for the first analysis frame [0:1024] [256:768], the second analysis frame [512: 1536] On the other hand, [768:1280]) may be divided into 7 subframes (FIG. 4(b)). Each of the seven sub-frames has a size of 128 sample points and overlaps between frames by 50%. As shown in (b) of FIG. 4, 5 sub-frames in the middle of the 7 sub-frames may be window processed by the Hann function. In addition, of the seven sub-frames, the first sub-frame and the last sub-frame may be window processed asymmetrically.

The LPC residual signal may be calculated for 7 sub-frames corresponding to 512 sample points in the middle region, which is 50% of the total frame having 1024 sample points. When 50% of the overlap of analysis frames occurs between sub-frames, there is no overlap between residual segments.

Figure 5:
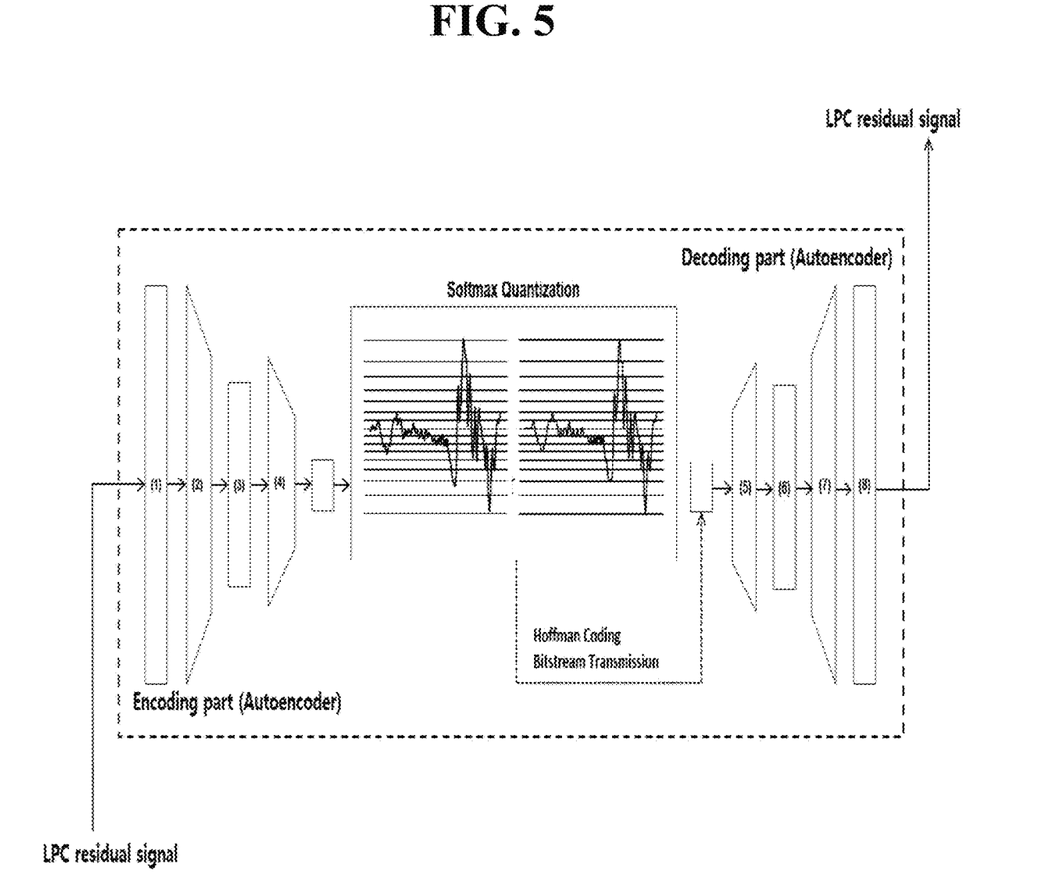
FIG. 5 is a diagram for explaining a process of cross module residual training (CMRL) according to an embodiment of the present invention.

FIG. 5 is a diagram for explaining a process of cross module residual training (CMRL) according to an embodiment of the present invention.

<End-to-End Speech Coding Autoencoders>

The 1D-CNN structure in time domain samples provides the desired autoencoder for end-to-end speech coding. As described in Table 1, in the autoencoder, the encoder part consists of 4 ResNet stages, the down-sampling convolution layer is reduced by half to a feature map in the middle, and the channel compression layer is a real number of 256 dimensions. It forms the real-valued code. Table 1 may correspond to the structure of an autoencoder included in the cross module residual training of FIG. 5. In an autoencoder, the decoder part has a mirrored structure of the encoder part. However, in the decoder part, the up-sampling layer may restore the original frame size (512 sample points) from the reduced code length (256 sample points).

In the structure of the 1D-CNN autoencoder, the input tensor and the output tensor are expressed as width and channel, but the kernel shape is as width, input channel, and output channel. Is expressed.

TABLE 1

| Layer | Input shape | Kernel shape | Output shape |
|---|---|---|---|
| Change channel | (512, 1) | (9, 1, 100) | (512, 100) |
| 1st bottleneck | (512, 100) | (9, 100, 20) ⎤<br>(9, 20, 20) ⎥ ×2<br>(9, 20, 100) ⎦ | (512, 100) |
| Downsampling | (512, 100) | (9, 100, 100) | (256, 100) |
| 2nd bottleneck | (256, 100) | (9, 100, 20) ⎤<br>(9, 20, 20) ⎥ ×2<br>(9, 20, 100) ⎦ | (256, 100) |
| Change channel | (256, 100) | (9, 100, 1) | (256, 1) |
| Change channel | (256, 1) | (9, 1, 100) | (256, 100) |
| 1st bottleneck | (256, 100) | (9, 100, 20) ⎤<br>(9, 20, 20) ⎥ ×2<br>(9, 20, 100) ⎦ | (256, 100) |
| Upsampling | (256, 100) | (9, 100, 100) | (512, 50) |
| 2nd bottleneck | (512, 50) | (9, 50, 20) ⎤<br>(9, 20, 20) ⎥ ×2<br>(9, 20, 50) ⎦ | (512, 50) |
| Change channel | (512, 50) | (9, 50, 1) | (512, 1) |

In the pipeline of cross module residual training, the LPC coding module provides a pre-processor with a fixed bit rate of 2.4 kbps. It may effectively model a spectral envelope, but it may not help quantization of the residual signal. For example, if the LPC doesn't model effectively for a frame, collaborative quantization may weight the following autoencoder more to use more bits.

According to an embodiment of the present invention, a trainable quantization module capable of restoring an LPC residual signal together with other autoencoder modules in cross-module residual training by dividing the LPC process may be generated.

Referring to FIG. 5, an LPC residual signal is generated by LPC analysis and quantization of a speech signal. And, the LPC residual signal is applied to the cross module residual training. Cross module residual training basically has a structure in which the structure of an autoencoder and softmax quantization are combined. In cross-module residual training, the LPC residual signal is reduced in dimension in the encoder part of the autoencoder, and then softmax quantization is applied. Then, the result of the softmax quantization is applied to the decoder part of the autoencoder again, and the dimension is expanded to restore the original LPC residual signal.

That is, in the cross module residual training, a residual signal obtained by LPC filtering a speech signal may be coded with an autoencoder having a CMRL structure. In this case, a bit allocated for LPC quantization and a bit allocated for LPC residual coding may be mutually independent. By enabling the LPC quantization to be trained, the performance of the speech codec may be improved by adjusting the bits allocated to the LPC quantization and the quantization of the LPC residual signal according to the characteristics of the speech signal.

Figure 6:
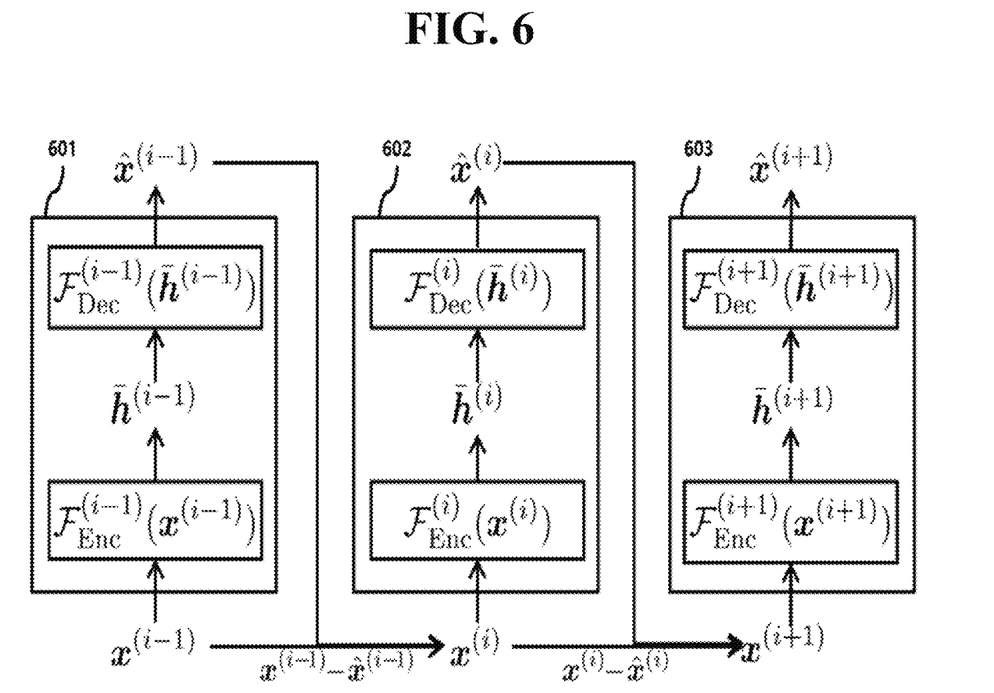
FIG. 6 is diagram for explaining a residual signal coding process of cross module residual training (CMRL) according to an embodiment of the present invention.

FIG. 6 is diagram for explaining a residual signal coding process of cross module residual training (CMRL) according to an embodiment of the present invention.

Cross-module residual training of FIG. 6 is an example of residual signal learning, which is step (2) of FIG. 1.

Referring to FIG. 6, cross module residual learning is obtained by serializing a list of autoencoders to enable residual training between building block modules of an autoencoder. Cross-module residual training does not depend on one autoencoder, but serializes the autoencoder's building block modules.

Referring to FIG. 6, an i−1$^{th}$ autoencoder 601, an i$^{th}$ autoencoder 602, and an i+1$^{th}$ autoencoder 603 may be connected in series. Then, the i−$^{th}$ autoencoder 601 generates an output signal $\hat{x}^{(i-1)}$ from the input signal $x^{(i-1)}$ At this time, the i−1th autoencoder 601 may be trained to have an input signal and an output signal similar to each other, and the difference between the input signal and the output signal of the i−1th autoencoder 601 is an i−1$^{th}$ residual signal. It may be set as an input of the autoencoder 602. That is, the input $x^{(i)}$ of the i$^{th}$ autoencoder 602 may be determined as a difference between $\hat{x}^{(i-1)}$ and which is the difference between the input signal and the output signal of the i−1$^{th}$ autoencoder 601.

Referring to FIG. 6, the i$^{th}$ autoencoder 602 may is inputted $x^{(i)}$ and train to predict $\hat{x}^{(i)} \approx x^{(i)}$. Except for the firstly placed autoencoder, the input $x^{(i)}$ of the i$^{th}$ autoencoder may be a residual signal or a difference between the sum of residual signals not reconstructed by the previously placed autoencoders and the input speech x. $x^{(i)}$ may be determined by Equation 3 below.

$$x^{(i)} = x - \Sigma_{j=1}^{i-1} \hat{x}^{(j)}$$ [Equation 3]

Cross-module residual training distributes the effort to optimize one neural network. Cross-module residual training reduces the complexity of the model in terms of learnable parameters, making the neural audio coding algorithm more suitable for user terminals with limited energy supply and storage space.

According to the pipeline of cross-module residual training, each autoencoder may be trained sequentially by using the residual signal of the previous module as the input of the current module. Once all autoencoders are trained, a fine-tuning process is performed to improve the overall restoration quality.

The loss function used in the training of each of the autoencoders consists of a reconstruction error and regularizers. The loss function is determined by Equation 4

$$\mathcal{L} = \lambda_1 \mathcal{T}(y\|\hat{y}) + \lambda_2 \mathcal{F}(y\|\hat{y}) + \lambda_3 Q(A_{soft}) + \lambda_4 \varepsilon(A_{soft})$$ [Equation 4]

When the input of collaborative quantization is given in the time domain, it is required to minimize the loss function in the time domain and in the frequency domain. The time domain error is measured as a mean squared error (MSE). $\mathcal{T}(y\|\hat{y})$ compensates for not being captured by non-perceptual $\mathcal{T}((y\|\hat{y})$ by measuring the loss function in the mel-scale frequency domain. The four mel-filter banks are specified in sizes of 128, 32, 16 and 8, which allows coarse-to-fine differentiation.

In Equation 4, $Q(A_{soft})$ and $\varepsilon(A_{soft})$ are regulators for softmax quantization. The soft assignment matrix Aa has already been described in FIG. 3. $Q(A_{soft})$ is described as $\Sigma_{i,j}(\sqrt{A_{soft}(i,j)}-1)/I$ which may ensure that the soft assignment matrix is closer to the hard assignment matrix.

$\varepsilon(A_{soft})$ may calculate the entropy of the softmax quantized bit string to control the bit rate. First, the frequency of each kernel is calculated by summing the columns of the soft assignment matrix according to Equation 5.

$$A_{soft}(\cdot,j) = E_i A(i,j)$$ [Equation 5]

The probability distribution P of the kernels indicates how often codes are allocated to each kernel, and is determined as in Equation 6.

$$p_j = A(\cdot,j)/(IJ)$$ [Equation 6]

And, the entropy is defined as in Equation 7.

$$\varepsilon(A_{soft}) = -\Sigma_j p_j \log_2(p_j)$$ [Equation 7]

The model is fine-tuned to the range of the desired bit rate by being adjusted $\lambda_4$. And, applying Huffman coding to grouped sample pairs (two adjacent samples per pair) provides a higher compression rate.

FIG. 7 is diagram for explaining a centralized distribution of differential coding through coding of a residual signal according to an embodiment of the present invention.

The present invention proposes a more simplified and scalable waveform neural codec. In collaborative quantization, LPC coefficient quantization becomes a trainable element so that it may be optimally combined with residual quantization.

The components described in the example embodiments may be implemented by hardware components including, for example, at least one digital signal processor (DSP), a processor, a controller, an application-specific integrated circuit (ASIC), a programmable logic element, such as a field programmable gate array (FPGA), other electronic devices, or combinations thereof. At least some of the functions or the processes described in the example embodiments may be implemented by software, and the software may be recorded on a recording medium. The components, the functions, and the processes described in the example embodiments may be implemented by a combination of hardware and software.

The apparatus described herein may be implemented using a hardware component, a software component and/or a combination thereof. A processing device may be implemented using one or more general-purpose or special purpose computers, such as, for example, a processor, a controller and an arithmetic logic unit (ALU), a DSP, a microcomputer, an FPGA, a programmable logic unit (PLU), a microprocessor or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will appreciated that a processing device may include multiple processing elements and multiple types of processing elements. For example, a processing device may include multiple processors or a processor and a controller. In addition, different processing configurations are possible, such a parallel processors.

The software may include a computer program, a piece of code, an instruction, or some combination thereof, to independently or collectively instruct or configure the processing device to operate as desired. Software and data may be embodied permanently or temporarily in any type of machine, component, physical or virtual equipment, computer storage medium or device, or in a propagated signal wave capable of providing instructions or data to or being interpreted by the processing device. The software also may be distributed over network coupled computer systems so that the software is stored and executed in a distributed fashion. The software and data may be stored by one or more non-transitory computer readable recording mediums.

The methods according to the above-described example embodiments may be recorded in non-transitory computer-readable media including program instructions to implement various operations of the above-described example embodiments. The media may also include, alone or in combination with the program instructions, data files, data structures, and the like. The program instructions recorded on the media may be those specially designed and constructed for the purposes of example embodiments, or they may be of the kind well-known and available to those having skill in the computer software arts. Examples of non-transitory computer-readable media include magnetic media such as hard disks, floppy disks, and magnetic tape; optical media such as CD-ROM discs, DVDs, and/or Blue-ray discs; magneto-optical media such as optical discs; and hardware devices that are specially configured to store and perform program instructions, such as read-only memory (ROM), random access memory (RAM), flash memory (e.g., USB flash drives, memory cards, memory sticks, etc.), and the like. Examples of program instructions include both machine code, such as produced by a compiler, and files containing higher level code that may be executed by the computer using an interpreter. The above-described devices may be configured to act as one or more software modules in order to perform the operations of the above-described example embodiments, or vice versa.

A number of example embodiments have been described above. Nevertheless, it should be understood that various modifications may be made to these example embodiments. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A residual signal coding method of LPC (Linear Prediction Coding) coefficients performed by a computing device, the residual signal coding method comprising:
    generating coded LPC coefficients and LPC residual signals by performing, by a computing device, LPC analysis and quantization on an input speech;
    determining a predicted LPC residual signal by applying the LPC residual signal to cross module residual learning;
    performing LPC synthesis using the coded LPC coefficients and the predicted LPC residual signal;
    determining an output speech that is a synthesized output according to the result of performing the LPC synthesis.

2. The residual signal coding method of claim 1, wherein the cross module residual learning including:
    applying a high-pass filter to the input speech;
    applying a pre-emphasis filter to a result applied by the high pass filter;
    determining the LPC coefficient from the result of applying the pre-emphasis filter;
    generating a soft assignment matrix of the coded LPC coefficients and softmax by quantizing the LPC coefficients; and
    determining an LPC residual signal based on a result of applying the pre-emphasis filter and a result of quantizing the LPC coefficients.

3. The residual signal coding method of claim 2, wherein the determining the LPC coefficient comprises:
    performing cross-frame windowing by applying a window to all frames of the input speech to which the pre-emphasis filter has been applied;
    performing sub-frame windowing by applying a window to a plurality of sub-frames corresponding to an intermediate region among all frames of the input speech from the cross-frame windowing result;
    performing synthesis windowing by overlapping the sub-frame windowing result.

4. The residual signal coding method of claim 1, wherein the LPC coefficient may be quantized by applying a trainable softmax to the LPC coefficient of a LSP (line spectrum pair) domain.

5. The residual signal coding method of claim 1, wherein the LPC residual signal is encoded by autoencoders of 1D-CNN (convolution neural network).

6. The residual signal coding method of claim 5, wherein the autoencoders of the 1D-CNN are trained sequentially by using a residual signal that is the output of a previous autoencoder, as the input of a following autoencoder.

7. The residual signal coding method of claim 5,
    wherein a differential coding is applied to the output of the autoencoder with respect to the autoencoders of the 1D-CNN,
    wherein the output of the autoencoder is applied with differential coding based on a length of the code for each frame of the autoencoder.

8. A computing device for performing a residual signal coding method of LPC coefficients, the computing device comprising: one or more processors configured to:
    generate encoded LPC coefficients and LPC residual signals by performing, by a computing device, LPC (Linear Prediction Coding) analysis and quantization on the input speech;
    determine a predicted LPC residual signal by applying the LPC residual signal to cross module residual learning;
    perform LPC synthesis using the coded LPC coefficients and the predicted LPC residual signal;
    determine an output speech that is a synthesized output according to the result of performing the LPC synthesis.

9. The computing device of claim 8,
    wherein the one or more processors perform:
    applying a high-pass filter to the input speech;
    applying a pre-emphasis filter to a result applied by the high pass filter, determining the LPC coefficient from the result of applying the pre-emphasis filter;

generating a soft assignment matrix of the coded LPC coefficients and softmax by quantizing the LPC coefficients; and determining an LPC residual signal based on a result of applying the pre-emphasis filter and a result of quantizing the LPC coefficients.

10. The computing device of claim 9, wherein the one or more processors for determining the LPC coefficient performs:

cross-frame windowing by applying a window to all frames of the input speech to which the pre-emphasis filter has been applied;

sub-frame windowing by applying a window to a plurality of sub-frames corresponding to an intermediate region among all frames of the input speech from the cross-frame windowing result;

synthesis windowing by overlapping the sub-frame windowing result.

11. The computing device of claim 8, wherein the LPC coefficient may be quantized by applying a trainable softmax to the LPC coefficient of a LSP domain.

12. The computing device of claim 8, wherein the LPC residual signal is encoded by 1D-CNN autoencoders.

13. The computing device of claim 12, wherein the autoencoders of the 1D-CNN are trained sequentially by using a residual signal that is the output of a previous autoencoder, as the input of a following autoencoder.

14. The computing device of claim 12, wherein a differential coding is applied to the output of the autoencoder with respect to the autoencoders of the 1D-CNN, wherein the output of the autoencoder is applied with differential coding based on a length of the code for each frame of the autoencoder.

\* \* \* \* \*